(12) United States Patent
Darabi et al.

(10) Patent No.: US 8,442,452 B2
(45) Date of Patent: *May 14, 2013

(54) INTEGRATED MULTIMODE RADIO TRANSMITTER AND COMPONENTS THEREOF

(75) Inventors: Hooman Darabi, Laguna Niguel, CA (US); Brima B. Ibrahim, Aliso Viejo, CA (US); Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 12/914,278

(22) Filed: Oct. 28, 2010

(65) Prior Publication Data

US 2011/0039505 A1    Feb. 17, 2011

Related U.S. Application Data

(63) Continuation of application No. 12/492,601, filed on Jun. 26, 2009, now Pat. No. 7,844,230, which is a continuation of application No. 11/838,034, filed on Aug. 13, 2007, now Pat. No. 7,561,852, which is a continuation of application No. 11/223,372, filed on Sep. 9, 2005, now Pat. No. 7,257,380, which is a continuation of application No. 09/993,801, filed on Nov. 14, 2001, now Pat. No. 6,970,681.

(51) Int. Cl.
*H04B 1/38* (2006.01)

(52) U.S. Cl.
USPC ............... 455/73; 455/78; 455/91; 455/118; 455/130; 370/532; 370/533; 370/537

(58) Field of Classification Search ............... 455/73, 455/78, 91, 118, 127.4, 130, 136, 138, 140, 455/144, 168.1, 207, 252.1; 370/532, 533, 370/537

See application file for complete search history.

(56) References Cited

U.S. PATENT DOCUMENTS

| | | | | |
|---|---|---|---|---|
| 6,970,681 B2 * | 11/2005 | Darabi et al. | .................. | 455/73 |
| 7,257,380 B2 * | 8/2007 | Darabi et al. | .................. | 455/73 |
| 7,561,852 B2 * | 7/2009 | Darabi et al. | .................. | 455/73 |
| 7,844,230 B2 * | 11/2010 | Darabi et al. | .................. | 455/73 |

* cited by examiner

*Primary Examiner* — Tuan Pham
(74) *Attorney, Agent, or Firm* — Garlick & Markison; Kevin L. Smith

(57) ABSTRACT

An integrated multi-mode radio transmitter includes a multiplexor and a shared front-end. The is operable to select an IF signal of a plurality of IF signals based upon a selection signal that is indicative of a particular operational mode of the one of the plurality of IF signals. The shared front-end is coupled to receive the selected IF signal, wherein the shared front-end converts the selected IF signal into a radio frequency (RF) signal that is modulated in accordance with the particular operational mode of the one of the plurality of IF stages.

15 Claims, 8 Drawing Sheets integrated multi-mode radio 10 multi-mode receiver 12 multi-mode transmitter 14 multi-mode receiver 62 multi-mode transmitter 64 integrated multi-mode radio 350

INTEGRATED MULTIMODE RADIO TRANSMITTER AND COMPONENTS THEREOF

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/492,601, entitled "Integrated Multimode Radio and Components thereof," filed Jun. 26, 2009, now issued as U.S. Pat. No. 7,844,230, on Nov. 30, 2010, which claims priority pursuant to 35 U.S.C. §120, as a continuation, to the following U.S. Utility patent application which is hereby incorporated herein by reference in its entirety and made part of the present U.S. Utility patent application for all purposes:

2. U.S. Utility application Ser. No. 11/838,034, entitled "Integrated Multimode Radio and Components thereof," filed Aug. 13, 2007, now issued as U.S. Pat. No. 7,561,852, on Jul. 14, 2009, which claims priority pursuant to 35 U.S.C. §120, as a continuation, to the following U.S. Utility Patent Application which is hereby incorporated herein by reference in its entirety and made part of the present U.S. Utility Patent Application for all purposes:

3. U.S. Utility application Ser. No. 11/223,372, "Integrated Multimode Radio and Components thereof," filed Sep. 9, 2005, now issued as U.S. Pat. No. 7,257,380, on Aug. 14, 2007, which claims priority pursuant to 35 U.S.C. §120, as a continuation, to the following U.S. Utility Patent Application which is hereby incorporated herein by reference in its entirety and made part of the present U.S. Utility Patent Application for all purposes:

4. U.S. Utility application Ser. No. 09/993,801, "Integrated Multimode Radio and Components thereof,", filed Nov. 14, 2001, now issued as U.S. Pat. No. 6,970,681, on Nov. 29, 2005.

TECHNICAL FIELD

This invention relates generally to wireless communications and more particularly to an integrated radio receiver and/or integrated radio transmitter.

BACKGROUND

The use of wireless communications for in-home, in-building networks, and/or direct communication is increasing in popularity and spawning relatively new standards including, but not limited to, Bluetooth, IEEE 802.11a, IEEE 802.11b, et cetera. As is known for wireless communications, data is modulated onto at least one radio frequency (RF) carrier frequency and transmitted as an RF modulated signal by a radio transmitter. A radio receiver receives the RF modulated signal and demodulates it to recapture the data.

As is further known, there are a variety of modulation/demodulation protocols that may be used for wireless communications. Such modulation/demodulation protocols include amplitude modulation (AM), frequency modulation (FM), amplitude shift-keying (ASK), frequency shift-keying (FSK), phase shift-keying (PSK), orthogonal frequency division multiplexing (OFDM), and/or variations thereof.

Regardless of the particular modulation/demodulation protocol, a radio receiver generally includes an antenna section, a filtering section, a low noise amplifier, an intermediate frequency (IF) stage and a demodulator. In operation, the antenna section receives RF modulated signals and provides them to the filtering section, which passes RF signals of interest to the low noise amplifier. The low noise amplifier amplifies the received RF signals and provides the amplified RF signals of interest to the IF stage. The IF stage includes one or more local oscillators, one or more mixers, and one or more adders to step-down the frequency of the RF signals to an intermediate frequency or base band frequency. The IF stage provides the IF or base-band signals to the demodulator, which, based on the particular modulation/demodulation protocol, recaptures the data.

While the basic elements of a radio receiver operating in accordance with one wireless standard perform generally the same functions as the basic elements of a radio receiver operating in accordance with another wireless standard, the specific functionality and construct of such elements may vastly differ. For example, the elements of a radio receiver designed in accordance with the Bluetooth specification have a substantially different specific functionality, and thus construct, than corresponding elements of a radio receiver designed in accordance with the IEEE 802.11b standard.

The specific functionality differences between the basic elements of a Bluetooth radio receiver and those of an IEEE 802.11b radio receiver result from the differences between the physical layer requirements of the two specifications. For instance, Bluetooth provides up to a 1 megabit-per-second data rate by employing a frequency-hopping scheme (i.e., 97 hops at 1 megahertz spacing) in the 2.4 GHz frequency band, such that the frequencies of interest are 2.402 GHz to 2.480 GHz. Bluetooth also specifies an FSK modulation/demodulation scheme and provides for 3 power classes (e.g., 1 mW, 2.5 mW and 100 mW). As such, a Bluetooth radio receiver includes a low noise amplifier, a $1^{st}$ IF stage operating with a 2 MHz intermediate frequency, band-pass filters, a $2^{nd}$ IF stage operating with a base-band frequency, and an FSK demodulator.

The IEEE 802.11b standard provides a variable data rate of 1, 2, 5.5, or 11 Mbps (megabits-per-second) by employing a direct sequence spread spectrum (DSSS) transmission scheme in the 2.4 GHz frequency band, such that the frequencies of interest are 2.400 GHz to 2.483 GHz. To achieve the 11 Mbps data rate, data is encoded using an 8-bit complimentary code keying (CCK) algorithm and modulated using a differential quadrature phase shift-keying (DQPSK) scheme. For a 5.5 megabit-per-second operation, the CCK encoded data is modulated using a differential binary phase shift-keying (DBPSK) modulation scheme. As such, an IEEE 802.11b compliant radio receiver includes a low noise amplifier, an IF stage having a base-band intermediate frequency, low pass filters, gain stages, and a DQPSK and/or DBPSK demodulator.

Since both IEEE 802.11b and Bluetooth specifications were created for localized (e.g., in-building, in-home, in parking lots, in stadiums, in hospitals, et cetera) wireless communications, it is conceivable that some wireless applications would be better served by Bluetooth while other wireless applications would be better served by 802.11b. In such an instance, it would be desirable for a wireless communication device to be able to operate in accordance with both the Bluetooth standard and the 802.11b standard. But, to do so, the device requires a separate Bluetooth radio (i.e., Bluetooth radio transmitter and Bluetooth radio receiver) and a separate 802.11b radio (i.e., 802.11b radio transmitter and 802.11b radio receiver). Such additional circuitry, while providing additional functionality, adds to the cost and complexity of such wireless devices.

Therefore, a need exists for an integrated radio receiver and/or integrated radio transmitter that support multiple wireless communication standards including, but not limited to Bluetooth and IEEE 802.11b.

SUMMARY

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

DETAILED DESCRIPTION OF THE DRAWINGS

Figure 1:
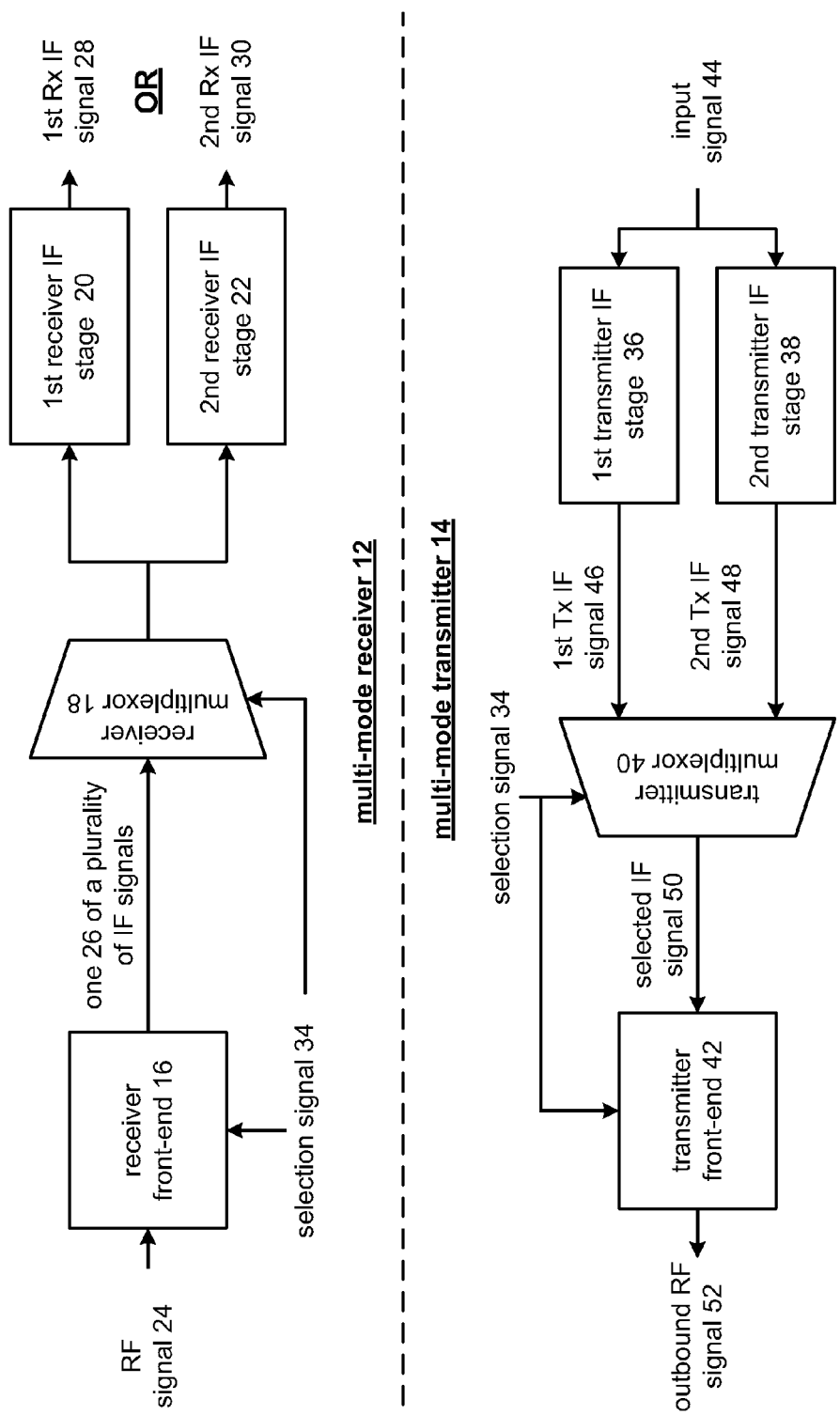
FIG. 1 illustrates a schematic block diagram of an integrated multimode radio in accordance with the present invention.

FIG. 1 illustrates a schematic block diagram of an integrated multimode radio 10 that includes a multimode receiver 12 and a multimode transmitter 14. The multimode receiver 12 includes a shared receiver front-end 16, a receiver multiplexor 18, and a plurality of receiver IF stages 20 and 22. The multimode transmitter 14 includes a shared transmitter front-end 42, a transmitter multiplexor 40, and a plurality of transmitter IF stages 36 and 38.

The shared receiver front-end 16 receives a radio frequency (RF) signal 24 and a selection signal 34. The selection signal 34 indicates the particular operational mode used to generate the RF signal 24. The RF signal 24 is a modulated signal in accordance with a particular operation mode, i.e., wireless communication standard. Such wireless communication standards include, but are not limited to, Bluetooth, IEEE 802.11a, IEEE 802.11b, analog mobile phone service (AMPS), digital AMPS (D-AMPS), global system for mobile (GSM), code division multiple access (CDMA), wireless application protocol (WAP), local multipoint distribution services (LMDS), and multi channel multipoint distribution system (MMDS).

The shared receiver front-end 16, based on the selection signal 34, generates an intermediate frequency (IF) signal 26 from the RF signal 24. For example, if the RF signal 24 is modulated in accordance with the Bluetooth specification, the selection signal 34 is indicative of the Bluetooth specification. Accordingly, the shared receiver front-end 16 configures itself to produce an IF signal 26 having an intermediate frequency of 2 megahertz. Alternatively, if the RF signal 24 is modulated in accordance with the IEEE 802.11b standard, the selection signal 34 is indicative of IEEE 802.11b. Accordingly, the shared receiver front-end 16 configures itself to produce an IF signal 26 that has an intermediate frequency at base-band. The construct and internal operations of the shared receiver front-end 16 will be described in greater detail with reference to FIGS. 4 and 8.

The receiver multiplexor 18 receives the IF signal 26 and selection signal 34. Based on the particular operation of mode indicated by the selection signal 34, the receiver multiplexor 18 provides the IF signal 26 to one of the plurality of receiver IF stages 20 and 22. As one of average skill in the art will appreciate, the multimode receiver 12 may include more receiver IF stages than the two depicted. However, if the integrated multimode radio 10 is designed to provide both Bluetooth and 802.11b applications, the multimode receiver 12 would include two receiver IF stages. One receiver IF stage would be configured for Bluetooth operations while the other is configured for 802.11b operations.

When the $1^{st}$ receiver IF stage 20 receives the IF signal 26 it produces a $1^{st}$ receiver IF signal 28. If the $2^{nd}$ IF stage receives the IF signal 26 it produces a $2^{nd}$ received IF signal 30. The construct and functionality of the receiver IF stages 20 and 22 will be described in greater detail with reference to FIGS. 3, 4, and 8.

As such, the multimode receiver 12 may be designed to meet the performance requirements of multiple wireless standards. For example, if the multimode receiver 12 is designed to meet the performance requirements of both Bluetooth and 802.11b specifications, the shared components of receiver 12 are designed to meet the more stringent requirements of 802.11b. By designing to the more stringent requirements, the less stringent requirements of Bluetooth will inherently be met.

The multimode transmitter 14 receives an input signal 44 via one of the plurality of transmitter IF stages 36 or 38. The number of transmitter IF stages included within transmitter 14 will depend on the number of different types of wireless specifications supported by the integrated multimode radio 10. For example, if the integrated multimode radio 10 supports Bluetooth and 802.11b, the transmitter 14 will include one transmitter IF stage for the Bluetooth mode (e.g., stage 36) and one for the 802.11b mode (e.g., IF stage 38). As one of average skill in the art will appreciate, when the selection signal 34 is indicative of one mode of operation, the IF stage 36 or 38 that corresponds to the other mode of operation may be disabled. This is equally applicable to the receiver IF stages 20 and 22. For example, if the selection signal 34 is indicative of Bluetooth operation, the transmitter IF stage and the receiver IF stage corresponding to the 802.11b operation would be disabled.

The enabled transmitter IF stage 36 or 38 generates a transmitter IF signal 46 or 48 dependent on the particular mode of operation. The operation of the $1^{st}$ transmitter IF stage 36 and $2^{nd}$ transmitter IF stage 38 will be described in greater detail with reference to FIGS. 3, 5, and 8.

The transmitter multiplexor 40 passes either the $1^{st}$ transmit IF signal 46 or the $2^{nd}$ transmit IF signal 48 to the transmitter front-end 42 as the selected IF signal 50 based on the selection signal 34. The transmitter front-end 42 up-converts the frequency of the selected IF signal 50 and amplifies it to produce the outbound RF signal 52. Note that the outbound RF signal 52 will be modulated in accordance with the particular operational mode of the particular operation of mode selected. For example, if the operational mode is Bluetooth, the outbound RF signal 52 will be in accordance with the Bluetooth standard. Alternatively, if the mode of operation is 802.11b, the outbound RF signal 52 will be in accordance with the 802.11b standard.

Figure 2:
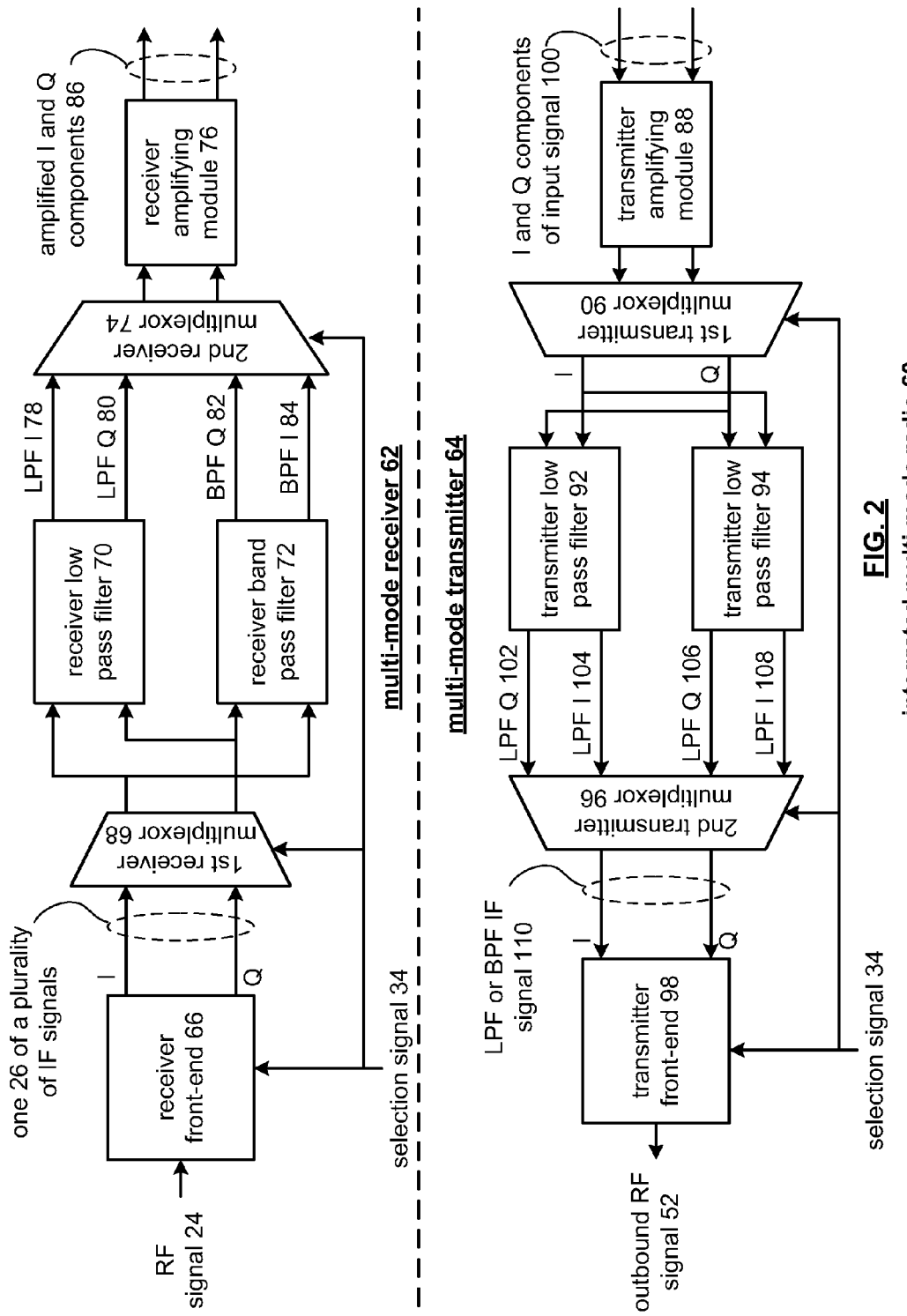
FIG. 2 illustrates a schematic block diagram of an alternate integrated multimode radio in accordance with the present invention.

FIG. 2 illustrates a schematic block diagram of an alternate integrated multimode radio 60 that includes a multimode receiver 62 and a multimode transmitter 64. The multimode receiver 62 includes a shared receiver front-end 66, a $1^{st}$ receiver multiplexor 68, a receiver low pass filter 70, a receiver band-pass filter 72, a $2^{nd}$ receiver multiplexor 74, and a receiver amplifier module 76. The multimode transmitter 64 includes a transmitter amplifying module 88, a $1^{st}$ transmitter multiplexor 90, a first transmitter low pass filter 92, a second transmitter low pass filter 94, a $2^{nd}$ transmitter multiplexor 96, and a shared transmitter front-end 98.

The shared receiver front-end 66 is operably coupled to receive the RF signal 24. As previously mentioned, the RF signal 24 may be modulated in accordance with one of a plurality of operational modes (e.g., Bluetooth, 802.11a, 802.11b, et cetera). The receiver front-end 66 generates an IF signal 26 based on the selection signal 34. As previously mentioned, the selection signal 34 is indicative of the particular mode of operation for the multimode receiver 62.

As shown, the IF signal 26 includes an in-phase component (I) and a quadrature component (Q). The particular frequency for the IF signal 26 is dependent on the particular mode of operation. For example, if the mode of operation is Bluetooth, the intermediate frequency signal 26 may have an intermediate frequency of 2 MHz. If, however, the mode of operation is 802.11b, the intermediate frequency signal 26 may have an intermediate frequency at base-band.

The $1^{st}$ receiver multiplexor 68, based on the selection signal 34, provides the I and Q components of the IF signal 26 to either the receiver low pass filter 70 or the receiver band-pass filter 72. When the mode of operation is 802.11b, the selection signal 34 instructs the $1^{st}$ receiver multiplexor 68 to provide the I and Q components of IF signal 26 to the receiver low pass filter 70. Conversely, if the mode of operation is Bluetooth, the $1^{st}$ receiver multiplexor 68 provides the I and Q components of the IF signal 26 to the receiver band-pass filter 72.

The low pass filter 70 filters the I component and Q component of IF signal 26 to produce a low pass filtered I signal 78 and a low pass filtered Q signal 80. These signals are then provided to the $2^{nd}$ receiver multiplexor 74. The receiver band-pass filter 72 filters the I and Q components of the IF signal 26 to produce band-pass filtered Q signal 82 and band-pass filtered I signal 84. These signals are also provided to the $2^{nd}$ receiver multiplexor 74. As one of the average skill in the art will appreciate, the frequency response of the low pass filter 70 and the band pass filter 72 will be in accordance with known filtering operations to adequately pass the frequencies of interest and attenuate other frequencies.

Based on the selection signal 34, the $2^{nd}$ receiver multiplexor 74 outputs either the low pass filtered I and Q signals 78 and 80 or the band-pass filtered I and Q signals 82 and 84 to the receiver amplifier module 76. The receiver amplifying module 76 amplifies the I and Q components to produce amplified I and Q components 86. As one of average skill in the art will appreciate, if the multimode receiver 62 is designed to support both Bluetooth operations and 802.11b operations, the amplifying circuitry within the receiver amplifying module 76 in combination with the amplifier within the receiver front-end 66 will be designed to meet the more stringent requirements of the 802.11b specification. By designing these components for the more stringent 802.11b requirements, the requirements for Bluetooth will be inherently met. The multimode receiver 62 will be described in greater detail with reference to FIG. 6.

The multimode transmitter 60 is operably coupled to receive an I and Q component of an input signal 100. The I and Q components of the input signal are representative of a modulated signal at an IF frequency based on the particular mode of operation. For example, if the mode of operation is Bluetooth, the frequency of the I and Q components of the input signal will be approximately 0 MHz. Alternatively, if the mode of operation is 802.11b, the input signal 100 will have a frequency at base-band.

The transmitter amplifying module 88 receives the I and Q components of input signal 100 and amplifies them. The transmitter amplifying module 88 provides the amplified input signal 100 to the $1^{st}$ transmitter multiplexor 90. Based on the selection signal 34, the $1^{st}$ transmitter multiplexor 90 outputs the I and Q components to either the transmitter low pass filter 92 (e.g., for Bluetooth operation) or the transmitter low pass filter 94 (e.g., for 802.11b operation). If the selection signal 34 indicates that the low pass filter 92 is to receive the signals, the low pass filter 92 filters the I and Q components to produce low pass filtered Q signal 102 and low pass filtered I signal 104. Alternatively, if the selection signal 34 indicates that low pass filter 94 filters is to receive the signals, the filter 94 filters the signal to produce low pass filtered Q signal 106 and low pass filtered I signal 108. As one of average skill in the art will appreciate, the frequency response of filters 92 and 94 will be based on the particular mode of operation. For example, filter 92 will have a frequency response to pass baseband signals, while filter 94 will have a frequency response to pass 2 MHz signals.

The $2^{nd}$ transmitter multiplexor 96 outputs either the low pass filtered I and Q signals 102 and 104 or the low pass filtered I and Q signals 106 and 108 based on the selection signal 34. The $2^{nd}$ transmitter multiplexor 96 provides the selected IF signal 100 to the transmitter front-end 98. Based on the selection signal 34, the transmitter front-end 98 up-converts the frequency of the IF signal 110 and amplifies it to produce the outbound RF signal 52. The multimode transmitter 64 will be described in greater detail with reference to FIG. 7.

Figure 3:
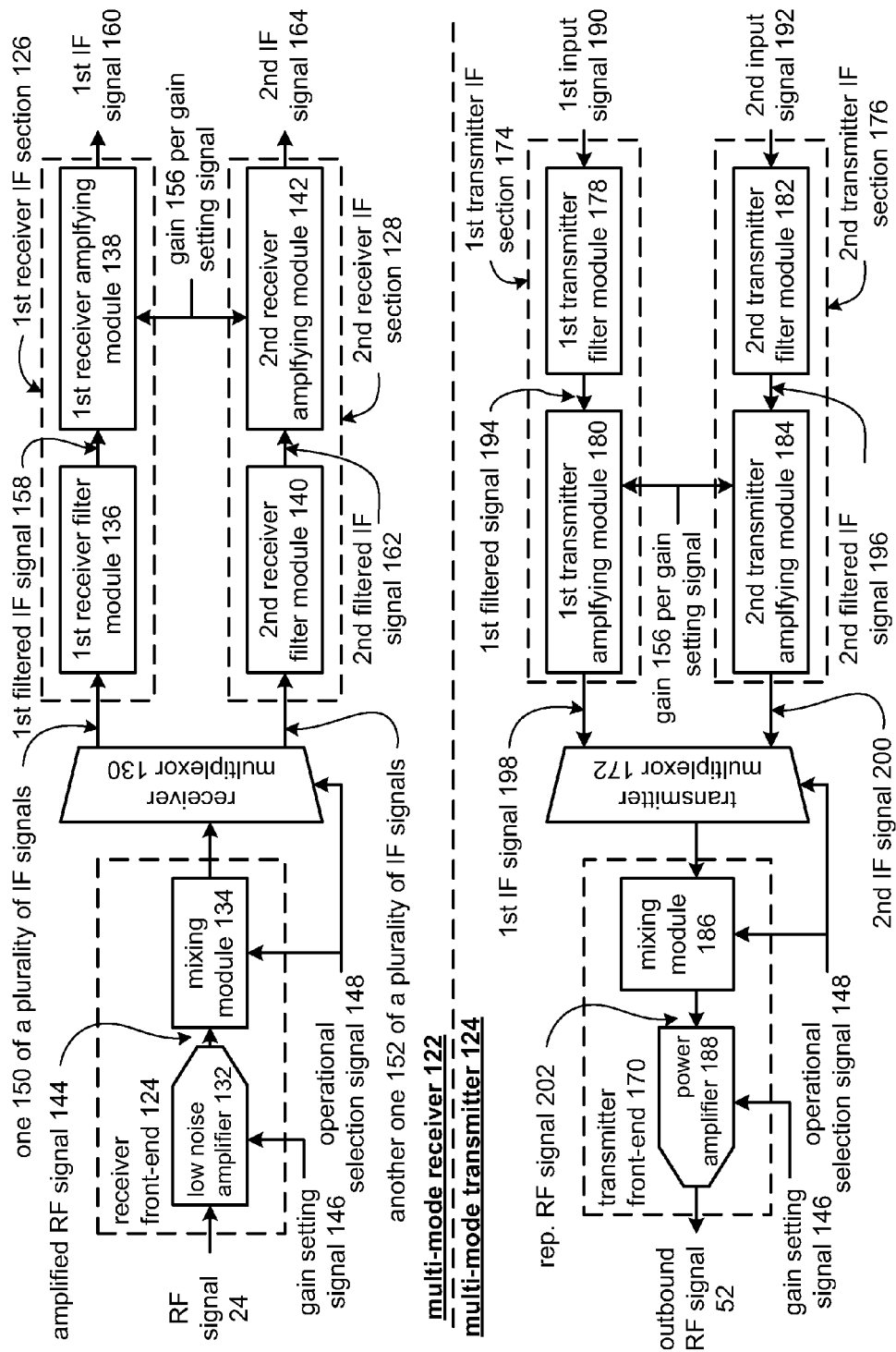
FIG. 3 illustrates another integrated multimode radio in accordance with the present invention.

FIG. 3 illustrates a schematic block diagram of another integrated multimode radio 120 that includes a multimode receiver 122 and a multimode transmitter 124. The multimode receiver 122 includes a receiver front-end 124, a receiver multiplexor 130, a $1^{st}$ receiver IF section 126, and a $2^{nd}$ receiver IF section 128. The multimode transmitter 124 includes a $1^{st}$ transmitter IF section 174, a $2^{nd}$ transmitter IF section 176, a transmitter multiplexor 172, and a transmitter front-end 170.

In operation, the receiver front-end 124 is operably coupled to receive the RF signal 24. As previously mentioned, the RF signal 24 is modulated in accordance with a particular wireless communication standard (e.g., Bluetooth, IEEE 802.11a, IEEE 802.11b, et cetera). The front-end receiver 124 includes a low noise amplifier 132 and a mixing module 134. The low noise amplifier 132 receives the RF signal 24 and a gain setting signal 146. The gain setting signal 146 sets the gain of the low noise amplifier 132 at a particular gain within a range of gain of the low noise amplifier. As such, the low noise amplifier 132 has a programmable gain, which is set in accordance with the gain setting signal 146. Based on the selected gain, the low noise amplifier 132 produces an amplified RF signal 144 from the RF signal 24.

The mixing module 134, which will be described at greater detail with reference to FIG. 4, receives the amplified RF signal 144 and an operational selection signal 148. The mixing module 134 produces an intermediate frequency signal from the amplified RF signal 144 based on the operational selection signal 148. The receiver multiplexor 130 receives the intermediate frequency signal from the front-end 124 and provides it as either intermediate frequency signal 150 to the 1$^{st}$ receiver IF section 126 or as another IF signal 152 to the 2$^{nd}$ receiver IF section 128. As one of average skill in the art will appreciate, the multimode receiver 122 may include additional receiver IF sections. Such additional IF sections would correspond to different modes of operation for the integrated multimode radio 120. For example, one mode may be in accordance with 802.11a, another mode in accordance with 802.11b, and another mode in accordance with Bluetooth.

The 1$^{st}$ receiver IF section 126 includes a 1$^{st}$ receiver filter module 136, and a 1$^{st}$ receiver amplifier module 138. The receiver filter module 136 is operably coupled to receive the IF signal 150 and filters it to produce a 1$^{st}$ filtered IF signal 158. The 1$^{st}$ receiver amplifying module 138 receives the 1$^{st}$ filtered IF signal 150 and a gain 156 that is set in accordance with the gain setting signal 146. Based on the gain 156, the 1$^{st}$ receiver amplifier module 138 amplifies the 1$^{st}$ receiver filter signal 158 to produce a 1$^{st}$ IF signal 150. The gain of the 1$^{st}$ receiver amplifying module is programmed over an IF gain range that is based on the IF gain setting signal 154. As one of average skill in the art will appreciate, the gain selected for the low noise amplifier 132, the 1$^{st}$ receiver filter module 136, and the 1$^{st}$ receiver amplifier module 138 are chosen to meet the requirements of the particular mode of operation supported by this path and on the power level of the received RF signal 24. For example, if this path supports 802.11b, the gain for these modules is set to meet the noise requirements and hence performance requirements for 802.11b for a given power level of the received RF signal 24.

The 2$^{nd}$ receiver IF section 128 includes a 2$^{nd}$ receiver filter module 140 and a 2$^{nd}$ receiver amplifying module 142. The 2$^{nd}$ receiver filter module 140 is operably coupled to filter the IF signal 152 to produce the 2$^{nd}$ filtered IF signal 162. The 2$^{nd}$ receiver amplifying module 142, based on gain 156, amplifies the 2$^{nd}$ filtered IF signal 162 to produce the 2$^{nd}$ IF signal 164. In this illustration, the 1$^{st}$ receiver IF section 126 supports a more stringent performance requirement based wireless communication standard than the 2$^{nd}$ receiver IF section 128. As such, the gain setting signal 146 and gain 156 are set to meet the more stringent requirements for the 1$^{st}$ receiver IF section. As such, the gain of the 2$^{nd}$ receiver IF section 128 is set as if the 1$^{st}$ receiver IF section 126 were actively processing the IF signal 150.

The multimode transmitter 124 is operably coupled to receive a 1$^{st}$ input signal 190 or a 2$^{nd}$ input signal 192. The 1$^{st}$ input signal 190 is representative of a modulated signal in accordance with a particular mode of operation of the integrated multimode radio 120. The 2$^{nd}$ input signal 192 is a modulated signal in accordance with another operational mode of the integrated multimode radio 120. For example, the 1$^{st}$ input signal 190 may be a modulated signal in accordance with 802.11b while the 2$^{nd}$ input signal 192 is a modulated signal in accordance with Bluetooth.

The 1$^{st}$ transmitter IF section 174 includes a 1$^{st}$ transmitter filter module 178 and a 1$^{st}$ transmitter amplifying module 180. The 1$^{st}$ transmitter filter module 178 filters the 1$^{st}$ input signal 190 to produce a 1$^{st}$ filtered IF signal 194. The 1$^{st}$ transmitter amplifier module 180 receives the 1$^{st}$ filtered IF signal 194 and the gain 156. The 1$^{st}$ transmitter amplifying module 180 amplifies the 1$^{st}$ filtered signal 194 based on gain 156 to produce the 1$^{st}$ IF signal 190.

Similarly, the 2$^{nd}$ transmitter IF section 176 includes a 2$^{nd}$ transmitter filter module 182 and a 2$^{nd}$ transmitter amplifying module 184. The 2$^{nd}$ transmitter filter module 182 filters the 2$^{nd}$ input signal 192 to produce the 2$^{nd}$ filtered IF signal 196. The 2$^{nd}$ transmitting amplifying module 184 amplifies the 2$^{nd}$ filtered IF signal 196 in accordance with gain 156 to produce the 2$^{nd}$ IF signal 200.

As one of average skill in the art will appreciate, when the 1$^{st}$ transmitter IF section 174 is processing a modulated signal of a wireless communication standard that has more stringent performance requirements than the signals processed by the 2$^{nd}$ transmitter IF section 176, the gain setting signal 146 and gain 156 will be selected based on the performance requirements of the 1$^{st}$ path. By setting the gain to meet the performance requirements of the more stringent path, the less stringent requirements of the other path or paths will be met. As one of average skill in the art will also appreciate, the multimode transmitter 124 may include more transmitter IF sections than the two shown. For example, the transmitter 124 may include three sections: one for processing Bluetooth signals, one for processing 802.11a signals, and one for processing 802.11b signals.

The transmitter multiplexor 172 receives the 1$^{st}$ IF signal 198 and/or the 2$^{nd}$ IF signal 200. Based on the operational selection signal 148, the transmitter multiplexor 172 outputs either the 1$^{st}$ IF signal 198 or the 2$^{nd}$ IF signal 200 to the transmitter front-end 170.

The transmitter front-end 170 includes a mixing module 186 and a power amplifier 188. The mixing module 186 receives the IF signal 198 or 200 and, based on the operational selection signals 148, up-converts the frequency to produce a representative RF signal 202. The power amplifier 188 based on a gain setting signal 146 amplifies the representative RF signal 202 to produce an outbound RF signal 52. Note that the gain setting signal 146, gain 156, and IF gain setting signal 154 are selected to meet the more stringent requirements of the 1$^{st}$ transmitter RF section 174. As such, by setting the gains to meet the more stringent requirements of a particular wireless communication protocol, the less stringent performance requirements of other wireless communication protocols will be met.

Figure 4:
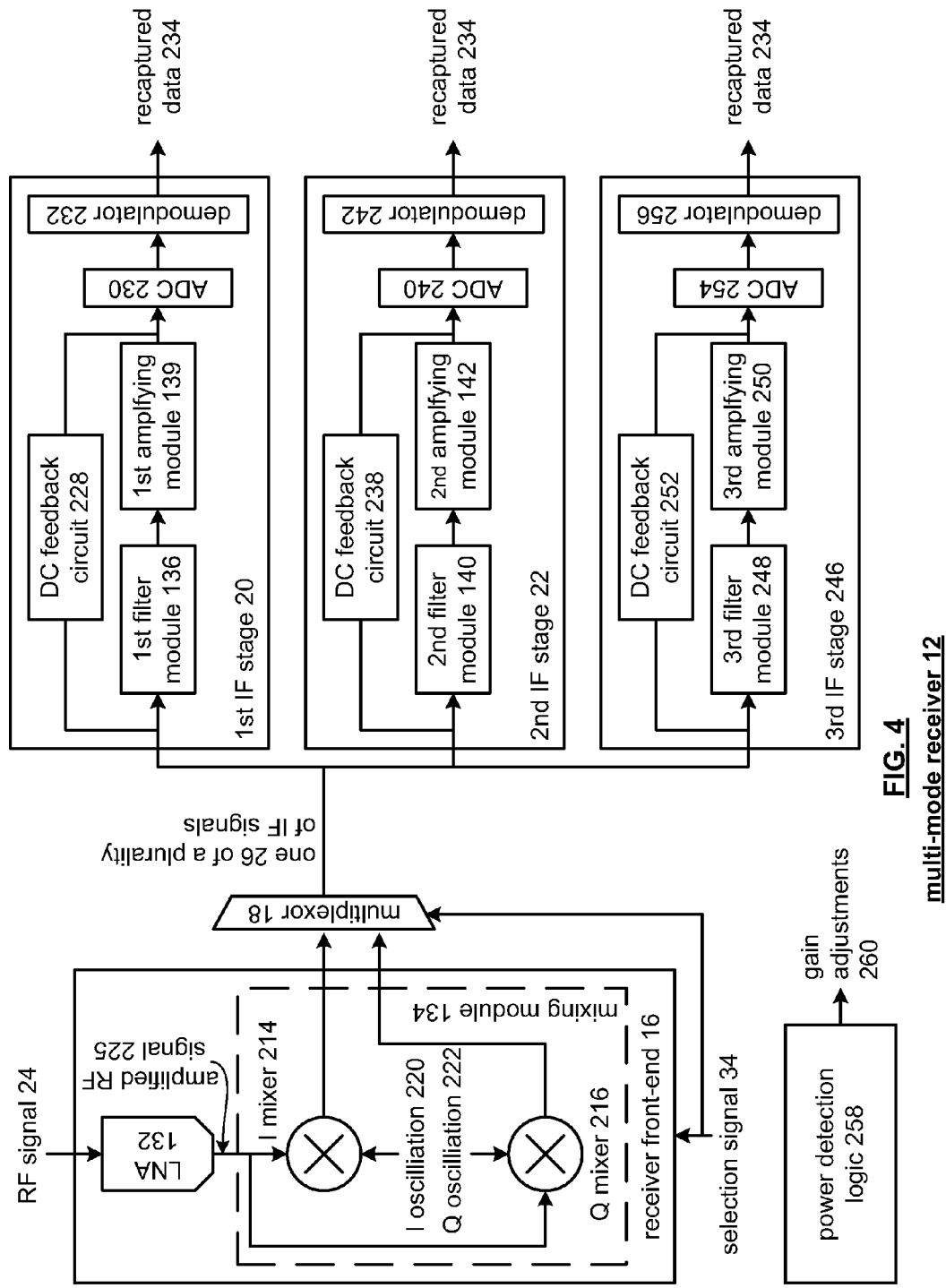
FIG. 4 illustrates a schematic block diagram of a multimode receiver in accordance with the present invention.

FIG. 4 illustrates a more detailed schematic block diagram of the multimode receiver 12 of the integrated multimode radio 10 of FIG. 1. The multimode receiver 12 includes the receiver front-end 16, the 1$^{st}$ IF stage 20, the multiplexor 18, the 2$^{nd}$ IF stage 22, a power detection logic circuit 258 and may further include a 3$^{rd}$ IF stage 246. The receiver front-end 16 includes a low noise amplifier 132 and mixing module 134. The mixing module 134 includes an I mixer 214 and a Q mixer 216.

The low noise amplifier 132 is operably coupled to amplify the RF signal 24 to produce an amplified RF signal 144. The I mixer 214 is operably coupled to mix (i.e., multiply) an I component of the amplified RF signal 144 with an I oscillation 220. The I oscillation 220 is representative of an I component of a local oscillation. The frequency of the local oscillation will be dependent upon the desired intermediate frequency. For example, if the frequency of the RF signal 24 is 2.402 GHz and the desired intermediate frequency is 2 MHz, the frequency of the local oscillation will be 2.400 GHz. Alternatively, if the RF signal 24 has a frequency of 2.400 GHz and the desired IF is 0, or base-band, the local oscillation will have a frequency of 2.400 GHz.

The Q mixer 216 mixes (e.g., multiples) a Q component of the amplified RF signal 144 and a Q oscillation 222 of a local oscillator. The outputs of Q mixer 216 and I mixer 214 are provided to the multiplexor 18. Note that, in general, the local oscillation selected for the I and Q oscillations 220 and 222 are based on the selection signal 34, which is indicative at the particular mode of operation.

The multiplexor 18 outputs the IF signal 26 to one of the IF stages 20, 22 or 246. If the multimode receiver 12 is supporting only two modes of operation, the $3^{rd}$ IF stage 246 may be omitted. For example, the multimode receiver 12 may support only Bluetooth and 802.11b. Alternatively, if the multimode receiver 12 supports three different modes, for example 802.11a, 802.11b and Bluetooth, the $3^{rd}$ IF stage 246 will be included.

The $1^{st}$ IF stage 20 includes the $1^{st}$ filter module 136, the $1^{st}$ amplifying module 138, a DC feedback circuit 228, an analog to digital converter 230, and a demodulator 232. The $1^{st}$ filtering module 136 and $1^{st}$ amplifying module 138 perform as previously discussed with reference to FIG. 3. The DC feedback circuit 228 is operably coupled to remove a DC component from the output of the $1^{st}$ amplifying module 138. The DC offset may result from the local oscillation coupling into the receiver section, which is then self mixed. As mentioned with reference to FIG. 3, the gains set within the low noise amplifier 132, the $1^{st}$ filtering module 136 and the $1^{st}$ amplifying module 138 are determined based on meeting the performance requirements of the more stringent wireless communication specification.

To determine the particular gains to be used, the power detection logic 258 determines the power level of the IF signal 24 to produce a gain adjustment signal 260. Accordingly, the gains of the low noise amplifier 132, the $1^{st}$ filtering module 136 and the $1^{st}$ amplifying module 138 are set in accordance with the gain adjustment signal 260. As one of average skill in the art will appreciate, the power level of the RF signal may be determined by monitoring the output of the $1^{st}$ amplifier module 138 to determine the magnitude of the signals. Based on the magnitude of the signal and the known operating parameters of the $1^{st}$ IF stage 20, the power level of the RF signal may be readily determined.

The analog to digital converter 230 receives the $1^{st}$ IF signal 160 (i.e., the output of the $1^{st}$ amplifying module 138) and converts it into a digital signal. The demodulator 232 receives the digital signal and demodulates it to produce recaptured data 234. The demodulator 232 utilizes a demodulation scheme in accordance with the particular function supported by the $1^{st}$ IF stage 20. For example, if the $1^{st}$ IF stage 20 corresponds to 802.11b, the demodulator 232 performs an 8-bit CCK demodulation.

The $2^{nd}$ IF stage 22 includes the $2^{nd}$ filter module 140, the $2^{nd}$ amplifying module 142, a DC feedback circuit 238, an analog to digital converter 240 and a demodulator 242. The functionality of the $2^{nd}$ filtering module 140 and $2^{nd}$ amplifying module 142 are as previously discussed in FIG. 3. The DC feedback circuit 238 performs a similar function as DC feedback circuit 238 to remove DC offset that may be present in the IF signal.

The analog to digital converter 240 receives the $2^{nd}$ IF signal 164 (i.e., the output of the $2^{nd}$ amplifying module 142) and converts it into a digital signal. The demodulator 242 demodulates the digital signal to recapture data 234. The particular demodulation scheme is dependent on the wireless communication standard supported by the $2^{nd}$ IF stage 22.

The $3^{rd}$ IF stage 246 includes a $3^{rd}$ filtering module 248, a $3^{rd}$ amplifying module 250, a DC feedback circuit 252, an analog to digital converter 254, and a demodulator 258. The functionality of the $3^{rd}$ IF stage 246 is comparable to the functionality of the $1^{st}$ and $2^{nd}$ IF stages. The $3^{rd}$ amplifying module 250 produces a $3^{rd}$ IF signal that is converted to a digital signal by the analog to digital converter 254. The demodulator 256 demodulates the digital signal to recapture data 234 based on the demodulation scheme of the wireless communication specification supported by the $3^{rd}$ IF stage 246.

Figure 5:
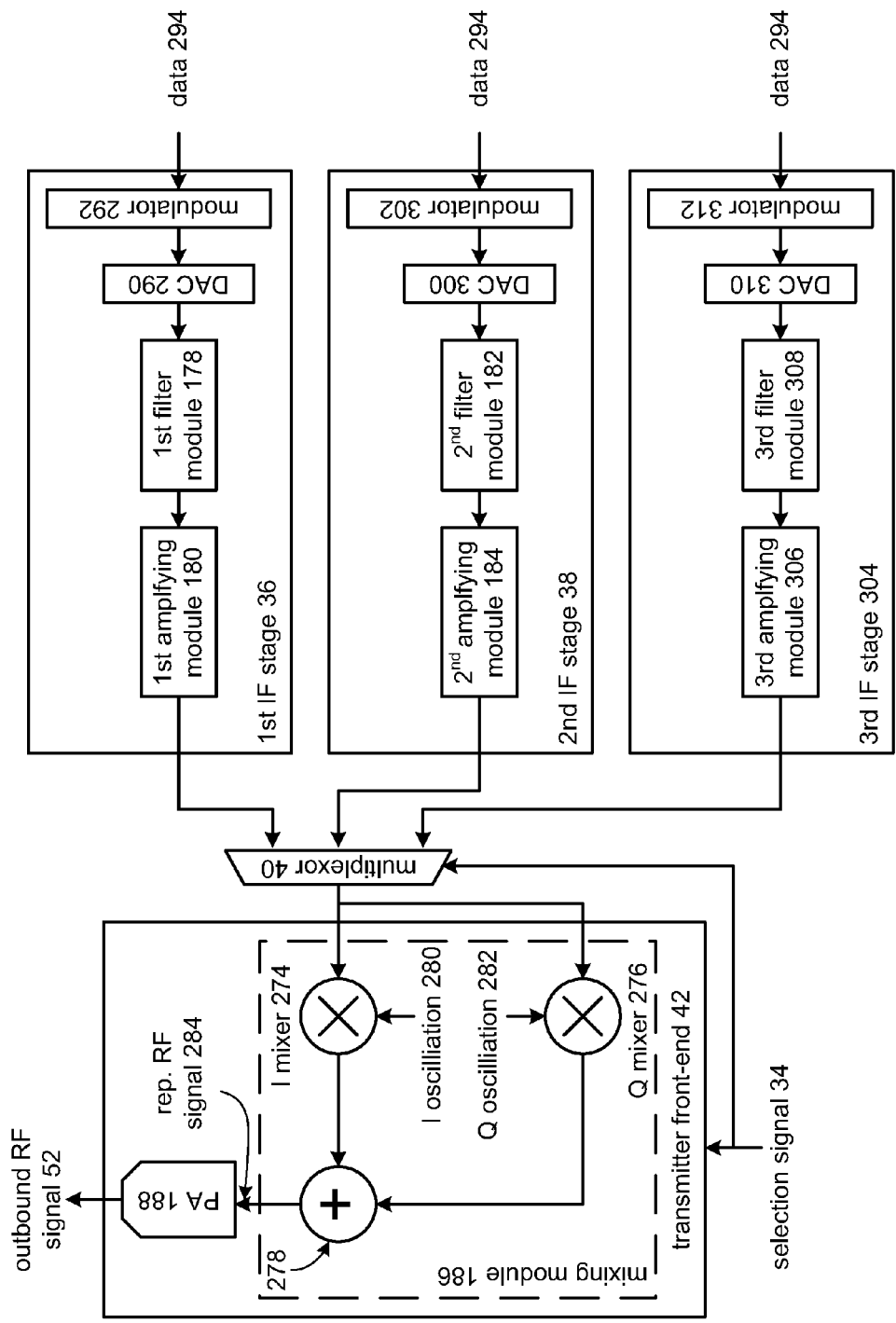
FIG. 5 illustrates a schematic block diagram of a multimode transmitter in accordance with the present invention.

FIG. 5 illustrates a more detailed schematic block diagram of multimode transmitter 14. In this illustration, the multimode transmitter 14 includes the transmitter front-end 42, multiplexor 40, the $1^{st}$ IF stage 36, the $2^{nd}$ IF stage 38 and may further include a $3^{rd}$ IF stage 304. The three IF stages 36, 38 and 304 are operably coupled to receive data 294. Depending on the particular mode of operation of the multimode transmitter, one of the IF stages will be activated. For example, in a two mode transmitter, the $1^{st}$ IF stage 36 may correspond to 802.11b, the $2^{nd}$ IF stage 38 may correspond to Bluetooth. If the multimode transmitter 14 is further to process 802.11a data, the $3^{rd}$ IF stage may be in accordance with 802.11a. In each of the IF stages, the data 294 is modulated via modulator 292, 302 or 312. The particular type of modulation performed is dependent upon the particular operational mode supported by the particular IF stage. For example, if the $1^{st}$ IF stage 36 is supporting 802.11b, the modulation scheme used by modulator 292 may be 8-bit CCK.

The modulated signal in each of the IF stages 36, 38 and 304, is converted to an analog signal by the digital to analog converter 290, 300 or 310. The corresponding analog signal is then filtered by the $1^{st}$ filtering module 178, the $2^{nd}$ filtering module 182 or the $3^{rd}$ filtering module 308. The filtered signal is then amplified either by the $1^{st}$ amplifying module 180, the $2^{nd}$ amplifying module 184 or the $3^{rd}$ amplifying module 306. The functionality of the $1^{st}$ and $2^{nd}$ amplifying modules and filtering modules are as previously discussed with reference to FIG. 3. The $3^{rd}$ amplifying module 306 and the $3^{rd}$ filtering module 308 will perform in a similar fashion as the amplifying and filtering modules of the $1^{st}$ and $2^{nd}$ IF stages 36 and 38 but in accordance with the particular mode of operation that it supports.

The multiplexor 40 provides the IF signal from the $1^{st}$, $2^{nd}$ or $3^{rd}$ IF stages 36, 38 or 304 to the transmitter front-end 42 based on the selection signal 34. The transmitter front-end 42 includes the power amplifier 188 and the mixing module 186. The mixing module 186 includes an I mixer 274, a Q mixer 276, and a summation module 278. The I mixer 274 mixes and I component 280 of the selected IF signal with an I component of a local oscillator. The Q mixer 276 mixes a Q component of the selected IF signal with a Q component 282 of the local oscillator. The outputs of the I and Q mixers 274 and 276 are summed together via by summation module 278. The resulting up-converted RF signal 284 is an amplified via power amplifier 188 to produce the outbound RF signal 52.

Figure 6:
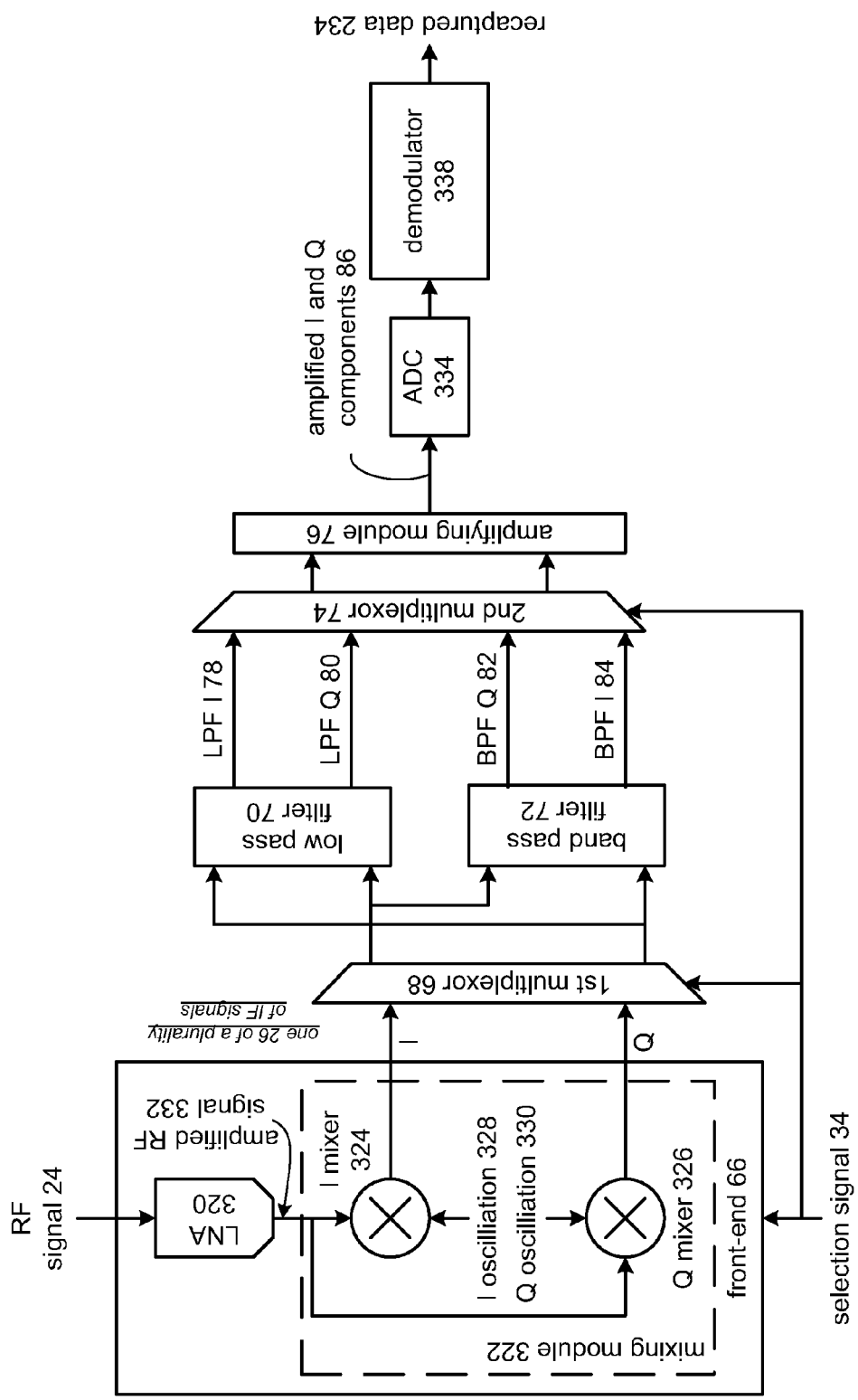
FIG. 6 illustrates a schematic block diagram of an alternate multimode receiver in accordance with the present invention.

FIG. 6 illustrates a more detailed schematic block diagram of the multimode receiver 62 of the integrated multimode radio 60 of FIG. 2. The multimode receiver 62 includes the receiver front-end 66, the $1^{st}$ multiplexor 68, the receiver low pass filter 70, the receiver band-pass filter 72, the $2^{nd}$ multiplexor 74, the receiver amplifying module 76, an analog to digital converter 334 and a demodulator 338. The receiver front-end 66 includes a low noise amplifier 320 and a mixing module 322. The mixing module 322 includes an I mixer 324 and a Q mixer 326.

The low noise amplifier 320 amplifies the RF signal 24 to produce an amplified RF signal 332. The I mixer 324 mixes an I component of the amplified RF signal 332 with an I component 328 of a local oscillator. The resulting I component of the mixed signal is provided to the $1^{st}$ multiplexor 68. The Q mixer 326 mixes a Q component 330 of the local oscillation with a Q component of the amplified RF signal 332. The resulting mixed Q component is provided to the $1^{st}$ multiplexor 68.

Based on the selection signal 34, the $1^{st}$ multiplexor 68 outputs the I and Q components to either the received low pass filter 70 or the received band-pass filter 72. For example, if the mode of operation is in accordance with 802.11b, the $1^{st}$ multiplexor 68 would provide the I and Q components to the low pass filter 70. If, however, the mode of operation is Bluetooth, the $1^{st}$ multiplexor 68 would provide the I and Q components to the band-pass filter 72.

The $2^{nd}$ multiplexor 74 outputs either the low pass filtered I and Q signals 78 and 80 or the band-pass filtered I and Q signals 82 and 84 to the receiver amplifying module 76 based on the mode of operation. As one of average skill in the art will appreciate, the gain set within the amplifying module 76 and the gain of the low noise amplifier 320 are set in accordance with the more stringent performance requirements of the multiple wireless communication protocol supported by the multimode receiver 62 and the power level of the RF signal. For example, if multimode receiver 62 is supporting 802.11b and Bluetooth, the more stringent performance requirements are in accordance with 802.11b. As such, the gain set within the low noise amplifier 320 and within the receiving amplifying module 76 will be in accordance with the performance requirements of 802.11b. The determination of the gains for these devices will be in accordance with the gain adjustment signals 260 previously described with reference to FIG. 4.

The I and Q components 86 outputted by the receiver amplifying module 76 are converted to digital signals via analog to digital converter 334. The digital I and Q signals are demodulated by demodulator 338 to produce recaptured data 234. As one of average skill in the art will appreciate, the demodulator 338 demodulates the data in accordance with the particular mode of operation.

Figure 7:
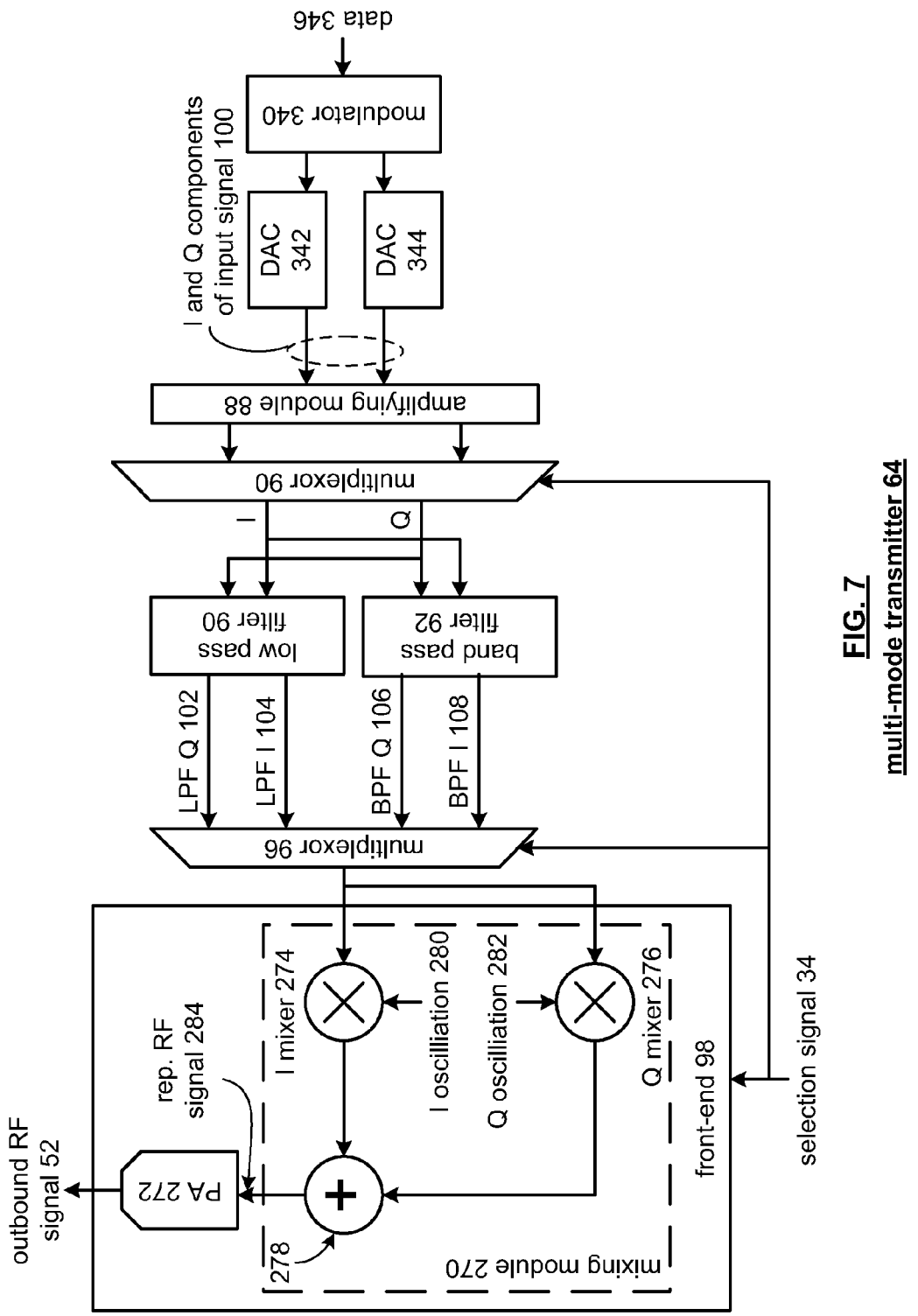
FIG. 7 illustrates a schematic block diagram of an alternate multimode transmitter in accordance with the present invention.

FIG. 7 illustrates a more detailed schematic block diagram of multimode transmitter 64 that was illustrated in the integrated multimode radio 60 of FIG. 2. The multimode transmitter 64 includes the front-end 98, multiplexor 96, low pass filter 90, band-pass filter 92, multiplexor 90, amplifying module 88, two digital to analog converters 342 and 344 and a modulator 340.

Depending on the particular mode of operation, the modulator 340 modulates data 346 to produce a digital I signal and a digital Q signal. For example, if the mode of operation is Bluetooth, the modulator 340 modulates the data in accordance with FSK. The digital to analog converters 342 and 344 convert the digital I and Q signals into the I and Q components of input signal 100. The performance of amplifying module 88, multiplexor 90, band-pass filter 92, low pass filter 90 and multiplexor 96 are as previously discussed with reference to FIG. 2.

The front-end 98 includes a power amplifier 272 and mixing module 270. The mixing module includes an I mixer 274, a Q mixer 276 and a summation module 278. The I mixer 274 mixes an I component of the selected IF signal with an I component 280 of the local oscillator. The Q mixer 276 mixes a Q component of the selected IF signal with a Q component 282 of the local oscillation. The resulting mixed signals are summed together by summation module 278 to produce an up-converted signal that is a representative RF signal 284. The power amplifier 272 amplifies the representative RF signal 284 to produce an outbound RF signal 52. Note that the I and Q components of the local oscillators 280 and 282 are based on the particular mode of operation.

Figure 8:
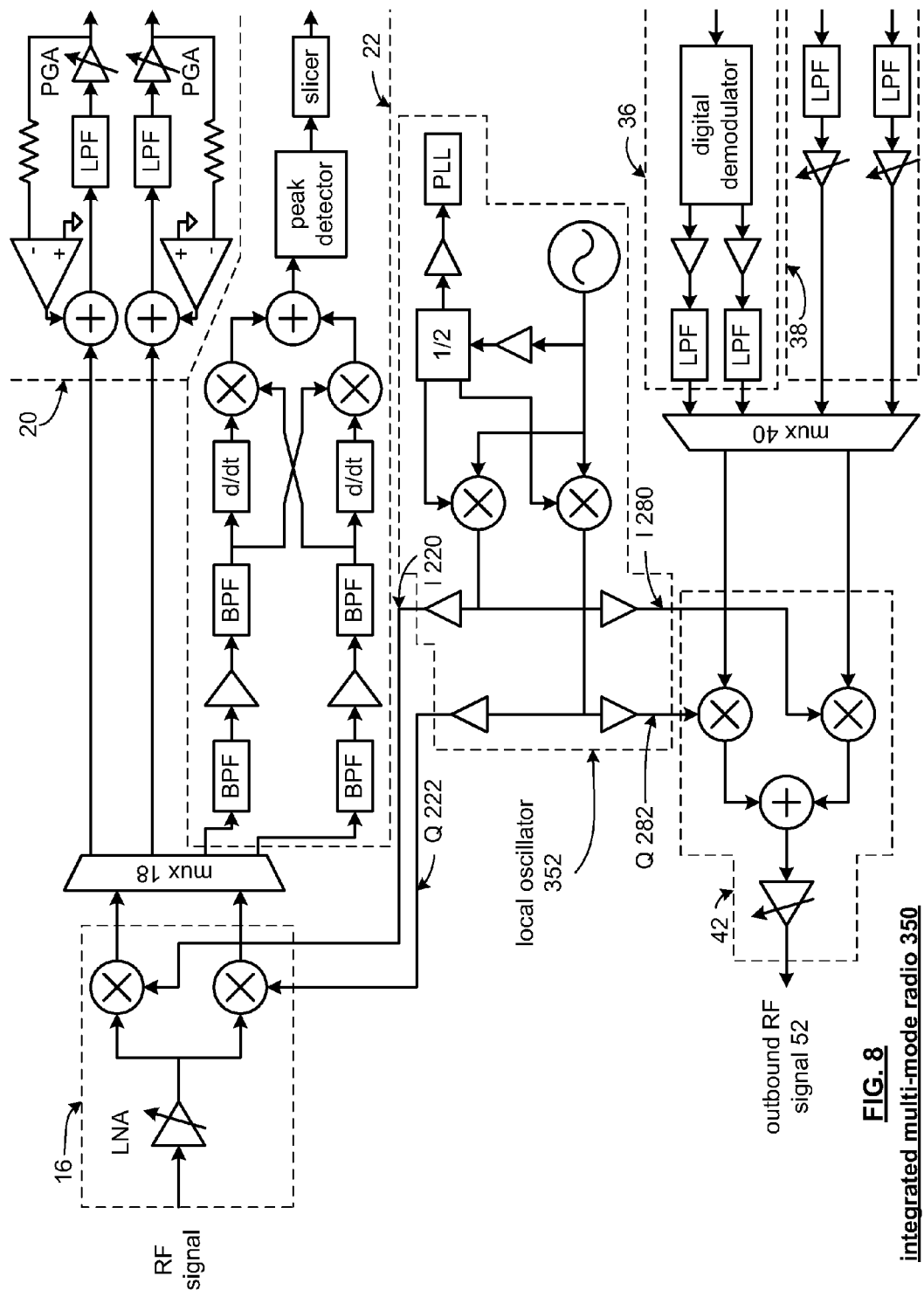
FIG. 8 illustrates a schematic block diagram of yet another integrated multimode radio in accordance with the present invention.

FIG. 8 illustrates a schematic block diagram of an integrated multimode radio 350. The radio 350 includes the multimode receiver 12, the multimode transmitter 14 and a local oscillator 352. The multimode receiver 12 includes the shared front-end 16, a $1^{st}$ IF stage 20, and the $2^{nd}$ IF stage 22. The multimode transmitter 14 includes the $1^{st}$ transmitter IF stage 36, the $2^{nd}$ transmitter IF stage 38, multiplexor 40 and the shared transmitter front-end 42. The local oscillator section 352 produces the I and Q components 220 and 222 that are used within the shared front-end 16 of multimode receiver 12 and the I and Q components 280 and 282 that are used within the shared front-end within the multimode transmitter 14. As one of average skill in the art will appreciate, the local oscillation used for the receiver may be the same or a different local oscillation than is used for the transmitter.

The implementation of the integrated multimode radio 350 includes low pass filters (LPF), programmable gain amplifiers (PGA), DC offset cancellation circuitry in the receive paths, fixed and/or variable gain buffers in the transmitter path and multiplexor circuits within the receive and transmit paths. The variable low noise amplifiers (LNA) and down converter mixers in the receive path are shared for both IF stages. The up-converter mixers in the transmit path and the variable power amplifier are shared for both IF stages 36 and 38.

In operation, the receiver path receives a radio frequency signal via an external antenna and is amplified by a high performance low noise amplifier. The amplified signal is then down-converted by the receiver mixer either to an intermediate frequency (IF) for Bluetooth operation or directly to base-band (zero IF) for 802.11b operation. For Bluetooth operations, the IF signal is filtered via the band-pass filters (BPF) to reject noise and interference and then through a differentiator that extracts the frequency signal. The peak detector and slicer finish the frequency demodulation signal extraction.

For 802.11b applications, the base-band signal from the down-converter mixer is passed through the low pass filters (LPF) to reject noise and interference out of the signal band. The filtered signals are then amplified by programmable gain amplifiers (PGA) before being buffered through the base-band digitization and processing circuits, which are either integrated on the same chip or off chip on another base-band chip. The DC cancellation circuits (e.g., amplifiers and resistors) are used to cancel DC offset that results from direct conversion to base-band.

In the transmitter path for Bluetooth operation, the modulated signal from the digital demodulator goes through low pass filters to band limit the signal to a useful signal bandwidth. The signal is then buffered by a fixed or variable gain buffer prior to reaching the multiplexor 40. The signal is then up-converted by the transmit mixer to a desired radio frequency, which is then amplified by the power amplifier.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for integrated multimode radios. By sharing similar functioning blocks for various modes of operation, and designing such shared blocks to meet the more stringent designed requirements, an integrated multimode receiver and/or integrated multimode transmitter is obtained. As one of average skill in the art will appreciate, other embodiments may be derived from the teachings of the present invention, without deviating from the scope of the claims.

What is claimed is:

1. An integrated multi-mode radio transmitter comprises:
   multiplexor operable to select an IF signal of a plurality of IF signals based upon a selection signal that is indicative of a particular operational mode of the one of the plurality of IF signals; and
   shared front-end coupled to receive the selected IF signal, wherein the shared front-end converts the selected IF signal into a radio frequency (RF) signal that is modulated in accordance with the particular operational mode of the one of the plurality of IF stages.

2. The integrated multi-mode radio transmitter of claim 1, wherein the shared front-end further comprises:
   mixing module coupled to convert the selected IF signal into a representative RF signal; and
   power amplifier having programmable gain, wherein the power amplifier is operably to amplify the representative RF signal to produce the RF signal, wherein the programmable gain is set within a range of gain based on desired power level of the RF signal.

3. The integrated multi-mode radio transmitter of claim 2, further comprises:
   first IF stage coupled to the multiplexor, the first IF stage including first filtering module and first amplifying module, wherein the first filtering module is operably coupled to filter the corresponding input signal of a first one of the plurality of IF stages to produce a filtered input signal, wherein the first amplifying module amplifies the filtered input signal to produce a corresponding IF signal, and wherein gain of the first amplifying module is programmable within an IF gain range based on the power level of the RF signal; and
   second IF section coupled to the multiplexor, the second IF stage including second filtering module and second amplifying module, wherein gain of the amplifying module is set to a gain within the IF gain range, wherein the second filtering module is operably coupled to filter the corresponding input signal of a second one of the plurality of IF stages into a second filtered input signal, wherein the second amplifying module amplifies the second filtered input signal to produce a second corresponding IF signal.

4. The integrated multi-mode radio transmitter of claim 3 further comprises:
   the multiplexor operable to couple the corresponding IF signal to shared front-end when the operational mode is in accordance with 802.11b; and
   the multiplexor operable to couple the second corresponding IF signal to the shared front-end when the operational mode is in accordance with Bluetooth.

5. The integrated multi-mode radio transmitter of claim 3 further comprises:
   third IF stage section coupled to the multiplexor, the third IF stage including third filtering module and third amplifying module, wherein the third filtering module is operably coupled to filter the corresponding input signal of a third one of the plurality of IF stages to produce a third filtered input signal, wherein the third amplifying module amplifies the third filtered input signal to produce a third corresponding IF signal, and wherein gain of the third amplifying module is programmable within an IF gain range based upon the power level of the RF signal.

6. The integrated multi-mode radio transmitter of claim 5 further comprises:
   the multiplexor operable to couple the corresponding IF signal to the shared front-end when the operational mode is in accordance with 802.11a;
   the multiplexor operable to couple the second corresponding IF signal to the shared front-end when the operational mode is in accordance with Bluetooth; and
   the multiplexor operable to couple the third corresponding IF signal to the shared front-end when the operational mode is in accordance with 802.11b.

7. The integrated multi-mode radio transmitter of claim 3, wherein the first IF stage further comprises:
   modulator operably coupled to modulate data in accordance with the selection signal to produce modulated data; and
   digital to analog converter operably coupled to convert the modulated data into the corresponding input signal.

8. An integrated multi-mode radio transmitter comprises:
   first IF section coupled to produce a first IF signal from a first input signal;
   second IF section coupled to produce a second IF signal from a second input signal;
   multiplexor operably coupled to select the first IF signal when an operational selection signal indicates a first mode of operation and to select the second IF signal when the operational selection signal indicates a second mode of operation; and
   shared front-end including a low noise amplifier and a mixing module, wherein gain of the low noise amplifier is programmable over a range of gain based on a gain setting signal, wherein the mixing module converts the first or second IF signal into a representative radio frequency (RF) signal, wherein the low noise amplifier is operably coupled to amplify the representative RF signal to produce an RF signal, wherein the IF gain range and the range of gain are based on performance requirements for converting the first IF signal into the RF signal.

9. The integrated multi-mode radio transmitter of claim 8, wherein:
   the first IF section including first filtering module and first amplifying module, wherein gain of the first amplifying module is programmable over an IF gain range based on an IF gain setting signal, wherein the first filtering module is coupled to filter the first input signal to produce a first filtered input signal, wherein the first amplifying module amplifies the first filtered input signal based on a gain programmed in accordance with the gain setting signal to produce the first IF signal; and the second IF section including second filtering module and second amplifying module, wherein gain of the second amplifying module is set to a gain within the IF gain range, wherein the second filtering module is operably coupled to filter the second input signal into a second filtered input signal, wherein the second amplifying module amplifies the second filtered input signal to produce the second IF signal.

10. The integrated multi-mode radio transmitter of claim 8 further comprises:

the multiplexor operable to couple the first IF signal to shared front-end when the operational mode is in accordance with 802.11b; and the multiplexor operable to couple the second IF signal to the shared front-end when the operational mode is in accordance with Bluetooth.

11. The integrated multi-mode radio transmitter of claim 8 further comprises:

third IF section coupled to produce a third IF signal from a third input signal.

12. The integrated multi-mode radio transmitter of claim 11 wherein:

the third IF section including third filtering module and third amplifying module, wherein gain of the third amplifying module is programmable over an IF gain range based on the IF gain setting signal, wherein the third filtering module is coupled to filter a third input signal to produce a third filtered input signal, wherein the third amplifying module amplifies the third filtered input signal based on a gain programmed in accordance with the gain setting signal to produce a third IF signal.

13. The integrated multi-mode radio transmitter of claim 11 further comprises:

the multiplexor operable to couple the first IF signal to the shared front-end when the operational mode is in accordance with 802.11a;

the multiplexor operable to couple the second IF signal to the shared front-end when the operational mode is in accordance with Bluetooth; and the multiplexor operable to couple the third IF signal to the shared front-end when the operational mode is in accordance with 802.11b.

14. The integrated multi-mode radio transmitter of claim 8, wherein the shared front-end further comprises:

mixing module operably coupled to convert I and Q components of the first or second IF signal into a representative RF signal; and power amplifier having programmable gain, wherein the power amplifier is operably to amplify the representative RF signal to produce the RF signal, wherein the programmable gain is set within a range of gain based on desired power level of the RF signal.

15. The integrated multi-mode radio transmitter of claim 14, wherein the mixing module further comprises:

I mixer operably coupled to mix the I component of the first or second IF signal with an I oscillation to produce an I intermediate frequency signal;

Q mixer operably coupled to mix the Q component of the first or second IF signal with a Q oscillation to produce a Q intermediate frequency signal; and summing module operably coupled to sum the I and Q intermediate frequency signals to produce the representative RF signal.

\* \* \* \* \*